United States Patent

Numakura

[15] 3,702,374

[45] *Nov. 7, 1972

[54] COLOR VIDEO SIGNAL RECORDING AND REPRODUCING APPARATUS WITH PILOT SIGNAL FOR AUTOMATIC COLOR CONTROL

[72] Inventor: Toshihiko Numakura, Tokyo, Japan

[73] Assignee: Sony Corporation, Tokyo, Japan

[ * ] Notice: The portion of the term of this patent subsequent to May 25, 1988, has been disclaimed.

[22] Filed: April 13, 1970

[21] Appl. No.: 27,715

[30] Foreign Application Priority Data

April 17, 1969 Japan ........................44/29866

[52] U.S. Cl...........178/5.2 R, 178/5.4 CD, 178/6.6 A

[51] Int. Cl...................................................H04n 9/02

[58] Field of Search..178/5.2 R, 5.4 CD, 6.6 A, 5.4 AL;325/62; 179/100.2 S, 100.2 K

[56] References Cited

UNITED STATES PATENTS

| | | | |
|---|---|---|---|
| 2,965,717 | 12/1960 | Bell | 325/62 |
| 3,424,860 | 1/1969 | Delvaux | 178/6.6 A |
| 3,506,777 | 4/1970 | Carlson | 178/5.4 CD |
| 3,580,990 | 5/1971 | Numakura | 178/5.2 A |
| 2,635,140 | 4/1953 | Dome | 178/5.4 AC |

*Primary Examiner*—Robert L. Griffin
*Assistant Examiner*—George G. Stellar
*Attorney*—Lewis H. Eslinger, Alvin Sinderbrand and Curtis, Morris & Safford

[57] ABSTRACT

In a color video signal recording and reproducing apparatus that records and reproduces a pilot signal along with the color video signal, so that any amplitude fluctuating component of the reproduced chrominance signal resulting from the recording and reproducing operations has its counterpart or corresponding variation in the pilot signal, the reproduced modulated chrominance signal and pilot signal are mixed to provide a mixed signal which is subjected to amplitude control, the pilot signal is separated from the amplitude-controlled mixed signal, variations in the pilot signal thus separated are detected, and such detected variations are employed for determining the amplitude control exerted on the mixed signal, whereby to diminish undesired variations in the chrominance signal derived from the amplitude-controlled mixed signal.

7 Claims, 5 Drawing Figures

INVENTOR.
TOSHIHIKO NUMAKURA

BY

INVENTOR.
TOSHIHIKO NUMAKURA

BY

PATENTED NOV 7 1972

3,702,374

INVENTOR.

TOSHIHIKO NUMAKURA

BY

COLOR VIDEO SIGNAL RECORDING AND REPRODUCING APPARATUS WITH PILOT SIGNAL FOR AUTOMATIC COLOR CONTROL

This invention relates generally to magnetic recording and reproducing of color television signals, and more particularly is directed to improvements in devices by which level variations in the reproduced signals may be automatically eliminated.

In recording and reproducing a color television signal with a magnetic recording and reproducing apparatus, the reproduced color subcarrier is often subjected to level variations resulting from changes in the travelling speed of the magnetic tape, changes in the contact of the magnetic tape with a magnetic head or the like. To avoid this, it is the practice in the prior art to employ an automatic color control circuit using a burst signal of one horizontal blanking period. Hence, the known arrangement acts as a sampling control system, and naturally cannot respond to changes in the level occurring within one horizontal scanning period. Further, the known arrangement has a response speed corresponding to a frequency as low as several to several hundred Hertz. Accordingly, it is impossible with the known control circuit to eliminate level changes occurring at a frequency exceeding several hundred Hertz.

Accordingly, an object of this invention is to provide an apparatus for magnetic recording and reproducing of color television signals which is capable of producing a high-quality reproduced color picture.

Another object is to provide a magnetic recording and reproducing apparatus as aforesaid which is provided with an automatic color control device of stable operation and high response speed so as to provide a high-quality reproduced picture.

A further object of this invention is to provide an automatic color control device of stable operation and high response speed which eliminates an amplitude fluctuating component of a reproduced signal resulting from the variations in the translation speed of the magnetic recording medium, in the contact of the recording medium with the magnetic head or the like.

Still a further object of this invention is to provide an automatic color control device for magnetic recording and reproducing apparatus which is simple in construction, stable in operation and high in response speed.

In accordance with an aspect of this invention, a pilot signal is recorded and reproduced with the color video signal by a common magnetic head, for example, as disclosed in the application for U.S. Letters Patent entitled "Recording and Reproducing System for Color Video Signals," identified as Ser. No. 775,277, filed Nov. 13, 1968, now U.S. Pat. No. 3,580,990, issued May 25, 1971, and having a common assignee herewith, so that the pilot signal undergoes amplitude variations corresponding to the amplitude fluctuating component of the modulated chrominance signal resulting from the recording and reproducing operations, and the amplitude of the reproduced chrominance signal is controlled in accordance with variations in the reproduced pilot signal so as to diminish undesirable variations in such chrominance signal resulting from the recording and reproducing operations.

In a particular embodiment of the invention, the reproduced chrominance signal and pilot signal are mixed to provide a mixed signal which is subject to amplitude control thereof, the pilot signal is separated from the amplitude-controlled mixed signal, variations in the separated pilot signal are detected, and such detected variations in the pilot signal are employed for determining the amplitude control exerted on the mixed signal.

The above, and other objects, feature and advantages of this invention, will become apparent from the following detailed description which is to be read in conjunction with the accompanying drawings, wherein.

Figure 1A:
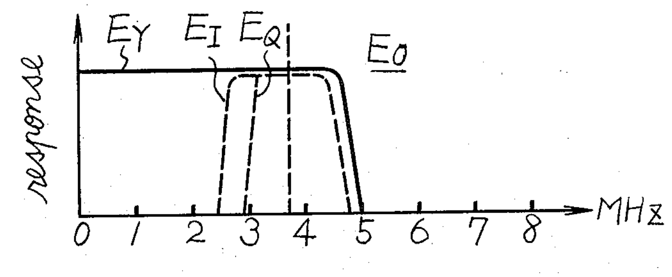
FIGS. 1A and 1B are graphic representations of the frequency spectra of a color video signal in one example of a color video signal recording and reproducing system to which this invention is applied.
Figure 1B:
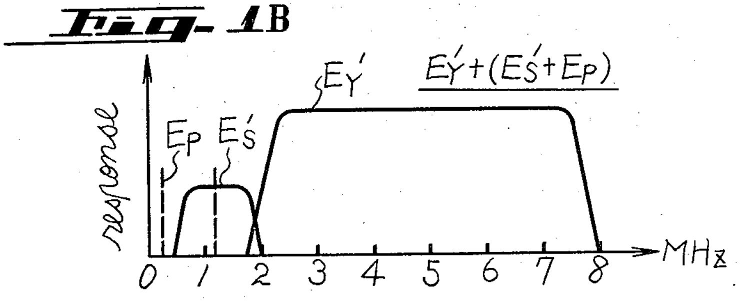

A description will be given first of the color television signal recording and reproducing system disclosed in the above-mentioned prior application Ser. No. 775,277, and to which this invention may be applied. This previously disclosed color television signal recording and reproducing system utilizes an NTSC composite color television signal $E_O$ which, as shown in FIG. 1A, consists of a luminance signal $E_Y$ and a modulated chrominance signal ($E_I$+$E_Q$) made up of color subcarriers of approximately 3.58 MC which are amplitude-modulated with I and Q signals and are 90° out of phase with each other, the frequency bands of the chrominance signal being included in the frequency band of the luminance signal $E_Y$. In the system being described, a carrier wave is frequency-modulated with the luminance signal $E_Y$ so that the tip level of a synchronizing signal of the composite signal $E_O$ may correspond to 4.5 MC and its white peak level to 6.0 MC, thus producing a frequency-modulated luminance signal $E_Y'$ having a frequency band width from about 2 MC to 7 MC (FIG. 1B). The composite color television signal $E_O$ is applied to a band-pass filter having a pass band characteristic of, for example, ±0.6 MC about the color subcarrier frequency of 3.58 MC which is included in the frequency bands of the chrominance signals $E_I$ and $E_Q$, thereby to provide a modulated chrominance signal $E_S$ (not shown), which is beaten down or frequency converted to provide a modulated chrominance signal $E_S'$ having a center frequency of, for example, 1.06 MC (FIG. 1B). Further, a pilot signal $E_P$ is produced to have a frequency, for example, of 354 KC, which does not interfere with the video signal according to the frequency interleaving method. The transmitted composite color television signal $E_O$ (FIG. 1A) is recorded and reproduced in the form of a combined signal containing frequency-modulated luminance signal $E_Y'$ and the frequency-converted modulated chrominance signal $E_S'$ together with the pilot signal $E_P$, as shown in FIG. 1B. The pilot signal $E_P$ and the modulated chrominance signal $E_S'$ are both recorded and reproduced at adjacent frequencies in a lower frequency band so that, even if they are subjected to phase variations in the recording and reproducing sections, the values of the phase variations are rendered substantially equal to each other. Consequently, the reproduced modulated chrominance signal, which is obtained by frequency-multiplying the pilot signal $E_P$ and by beating up the modulated chrominance signal $E_S'$ with the resulting frequency-multiplied signal and the color subcarrier of 3.58 MC, is a modulated chrominance signal $E_S$ having a certain center frequency of 3.58 MC which is substantially free from phase variations. Thus, a reproduced color picture can be produced which is free from variations in the phase of the chrominance signal.

Since the color video signal recording and reproducing system referred to above is described in detail in the above identified application, no further detailed description will be given in this specification.

In such a system, the luminance signal $E_Y'$ is frequency-modulated at the time of recording and reproducing so that a level change of the luminance signal caused in the recording and reproducing operations can readily be removed by a limiter. However, it is difficult to eliminate the level fluctuating component added to the modulated chrominance signal $E_S'$ in the recording and reproducing operations because the modulated chrominance signal $E_S'$ has amplitude-modulated side band components on both sides of the beaten-down center frequency. More specifically, high-speed fluctuating components cannot be removed with a conventional gain control system having a closed loop for its control.

This invention provides, for the foregoing system, an automatic color control device which employs a pilot signal and a closed loop system to enhance stability, and which is simple in construction and has a high response speed.

Figure 2:
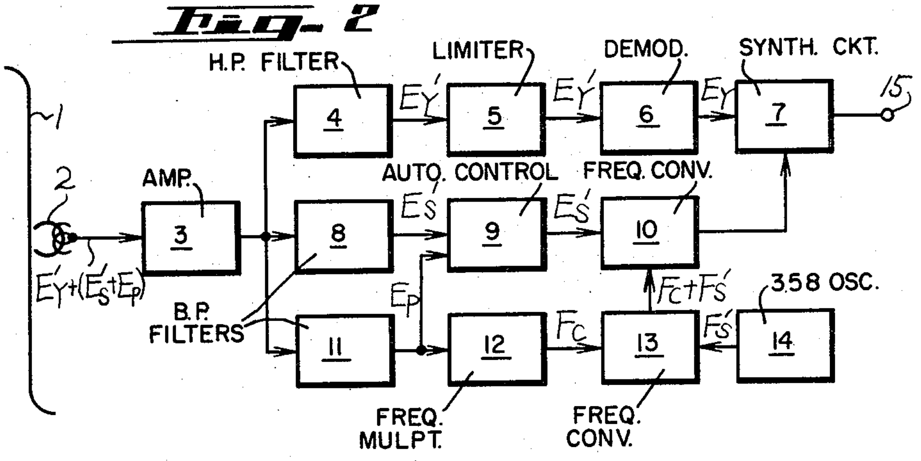
FIG. 2 is a block diagram illustrating one embodiment of the reproducing system of a magnetic recording and reproducing apparatus according to this invention.

Referring now to FIG. 2, it will be seen that, in the reproducing section of a magnetic video recording and reproducing device to which this invention has been applied, the combined recorded signal $[E_Y' + (E_S' + E_P)]$ depicted in FIG. 1B is reproduced by a magnetic head 2 from a magnetic tape 1 running in contact therewith and is applied to a limiter 5 through a playback amplifier 3 and a high-pass filter 4 to extract the frequency-modulated luminance signal $E_Y'$. The signal $E_Y'$ thus extracted is fed to a luminance-signal demodulator 6 to produce the luminance signal $E_Y$ which is supplied to a signal synthesizer circuit 7. One portion of the output of the playback amplifier 3 is supplied to a band-pass filter 8 to derive or extract therefrom the color or chrominance signal $E_S'$ which is applied to an automatic control device 9. Further, another portion of the output of the playback amplifier 3 is supplied to a band-pass filter 11 to derive or extract therefrom the pilot signal $E_P$ which is also applied to the automatic control device 9. The automatic color control device 9 produces a controlled color signal $E_s'$, which is fed to a frequency converter circuit 10. The extracted pilot signal is also applied to a frequency multiplier circuit 12 to produce a signal $F_C$, which is supplied to a frequency converter circuit 13 together with an output $F_S'$ of a 3058 MHz crystal oscillator 14. A signal $F_s' + F_C$ is thus derived from the frequency converter circuit 13 and is applied to the aforementioned frequency converter circuit 10. As a result of this, the modulated chrominance signal $E_S$ consisting of the $E_I$ and $E_Q$ signals is derived from the frequency converter circuit 10 and is supplied to the signal synthesizer circuit 7 to derive the composite color television signal $E_O$ at its output terminal 15.

Figure 3:
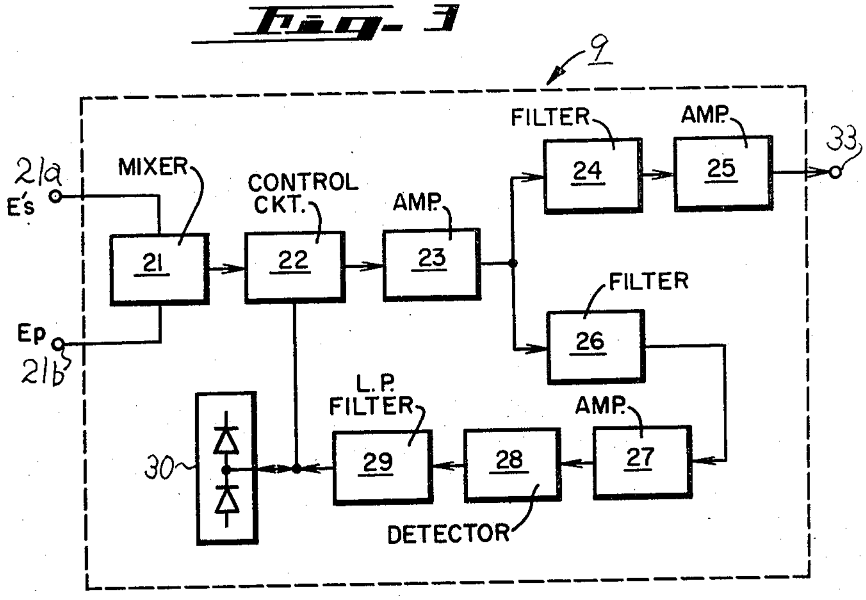
FIG. 3 is a block diagram showing one example of an automatic color control device that may be employed in the system of FIG. 2.

This invention will now be described in greater detail with reference to FIG. 3 showing an embodiment of the automatic color control device 9. As shown, the extracted frequency-shifted chrominance signal $E'_S$ and the extracted pilot signal $E_P$ are respectively applied to input terminals 21*a* and 21*b* of a mixer circuit 21 in which the signals are mixed together. The output of mixer circuit 21 is applied to a control circuit 22, whose output is, in turn, applied, as the input, to an amplifier circuit 23. The output of amplifier circuit 23 is supplied to filters 24 and 26 which respectively separate the chrominance signal and the pilot signal from each other. The output of filter 24 is supplied to an output amplifier circuit 25, while the output of filter 26, for separating the pilot signal, is supplied through another amplifier circuit 27 to a detector circuit 28, whose output is, in turn, supplied as input to a low-pass filter 29. The output of the low-pass filter 29 is connected to a fluctuating voltage limiter 30 and also to the input side of the control circuit 22, thus forming a closed loop for the pilot signal.

Figure 4:
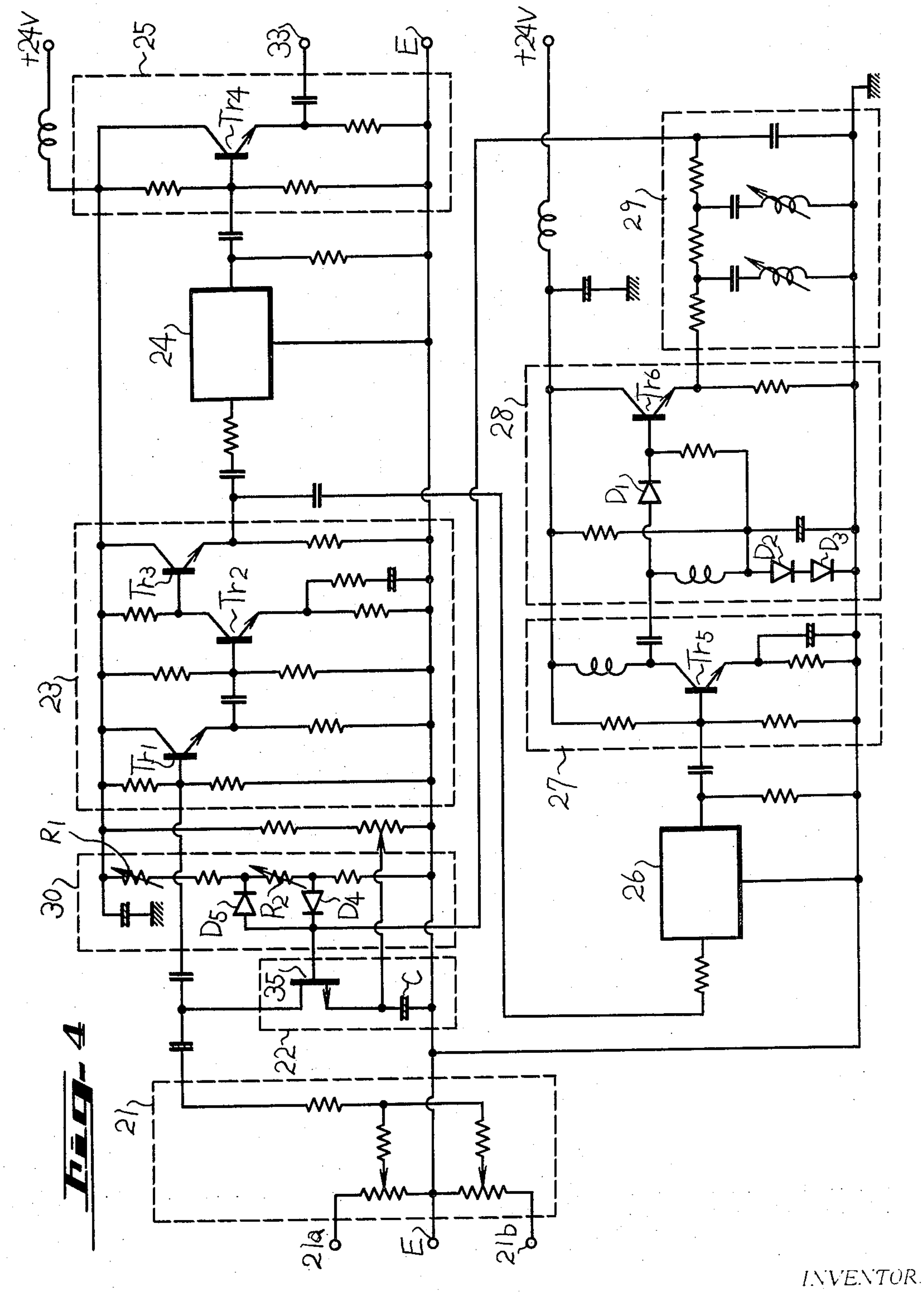
FIG. 4 is a schematic circuit diagram of the automatic color control device shown in FIG. 3.

As shown in detail on FIG. 4, in which the elements that may constitute the components represented by blocks on FIG. 3 appear within broken-line blocks that are similarly identified, the control circuit 22 may be made up of a field effect transistor 35. The amplifier circuit 23 connected to the output of control circuit 22, that is, to the drain electrode of field effect transistor 35, consists of, for example, NPN-type transistors $Tr_1$, $Tr_2$ and $Tr_3$ but this amplifier circuit may be omitted if the input gain is sufficiently large. The pilot signal $E_P$ is a signal of, for example, 354 kHz, and the color subcarrier or chrominance signal carrier may be an NTSC system signal of 3.58 MHz or a signal which is converted therefrom, for example, to 1.06 MHz. The filter 24 inhibits the passage therethrough of the pilot signal but permits the passage of the chrominance signal or frequency-converted chrominance signal, and this filter is a high-pass or band-pass filter. The output of the filter 24 is connected to the input of output amplifier 25 made up, for example, of an NPN-type transistor $Tr_4$, and the output appears at terminal 33 for feeding to the frequency converter 10 on FIG. 2.

The filter 26 connected in parallel relation to filter 24 inhibits the passage therethrough of the chrominance signal or frequency-converted chrominance signal, but permits the passage of the pilot signal and this filter is a low-pass of band-pass filter. The amplifier circuit 27 connected to the output of filter 26 consists of, for example, an NPN-type transistor $Tr_5$, but amplifier 27 may also be omitted if output gain of filter 26 is sufficiently large. The detector circuit 28 connected to the output of amplifier circuit 27 is shown to include a diode $D_1$. The pilot signal derived from the filter 26 and amplified by amplifier circuit 27 is detected by diode $D_1$ and the detected output is fed to the low-pass filter 29 through, for example, an emitter-follower resistor for an NPN-type transistor $Tr_6$. Diodes $D_2$ and $D_3$ incorporated in detector circuit 28 feed a bias voltage to the transistor $Tr_6$ for effecting temperature compensation of the latter.

The low-pass filter 29 is provided to inhibit the passage therethrough of the fundamental wave of the pilot signal and also of the second and higher harmonic components thereof, but permits the passage of the detected output of the pilot signal only and this filter 29 may include, for example, two sets of traps, resistors and capacitors, as shown.

The detected output derived from low-pass filter 29 is applied to the gate electrode of field effect transistor 35 and, at the same time, to the cathode and anode of diodes $D_4$ and $D_5$ making up the fluctuating voltage limiter 30. The drain electrode of field effect transistor 35 in control circuit 22 is connected to the connection between the output of mixer 21 with the input of amplifier 23, and the source electrode of transistor 35 is connected to a slider of a potentiometer P and grounded through a capacitor C of about 50 microfarads.

The operation of the circuit shown in FIG. 4 is as follows: The field effect transistor 35 making up control circuit 22 is such that, when the voltage between its drain and source is in the pinch-off region, the resistance between the drain and source decreases substantially exponentially with an increase in the gate voltage, as is well known in the art. Accordingly, with the drain electrode of field effect transistor 35 connected to the connection between the output of mixer 21 and the input of amplifier 23 and with the source electrode of transistor 35 connected to the ungrounded terminal of capacitor C, the field effect transistor 35 is controlled so that an increase in the fluctuating voltage impressed on the gate electrode of field effect transistor 35 causes a decrease in the output of the control circuit 22, that is, a decrease in the input to amplifier 23. Conversely, a decrease in the fluctuating voltage causes an increase in the output of control circuit 22. As a result of this, the level change of the color subcarrier or chrominance signal is compensated. The potentiometer P makes possible adjustment of the operating point of the field effect transistor 35.

Both the pilot signal and the color subcarrier or chrominance signal are impressed together between the drain and source electrodes of field effect transistor 35 and, in order to avoid cross modulation between these two signals, it is preferred to utilize that portion of the operating characteristic of transistor 35 where there is a gradual or gentle resistance change between the drain and source electrodes. Alternatively, cross modulation may be avoided by reducing the levels of the pilot and chrominance signals before applying the same to transistor 35. The fluctuating voltage limiter 30 made up of the diodes $D_4$ and $D_5$ is provided to prevent an abnormal increase in the gain of the control system when both the color subcarrier or chrominance signal and the pilot signal have been interrupted by a dropout of the reproduced signal. Either one of the diodes $D_4$ and $D_5$ may be omitted in relation to the polarity of a power source voltage. Variable resistors $R_1$ and $R_2$ are respectively provided for determining the center level of the fluctuating voltage and also the extent of fluctuation from the center level in clipping the fluctuating voltage.

Briefly stated, when the color subcarrier or chrominance signal $E'_S$ and the pilot signal $E_P$ have frequencies that are located close to each other, the level variations of their reproduced signals very nearly correspond to each other and can be regarded as substantially equal to each other, so that the level change of the reproduced pilot signal may be detected and employed to produce a fluctuating voltage by which the level of the color subcarrier is controlled at high response speed so as to remain constant. The circuits shown on FIG. 4 effectively achieves the foregoing with the color subcarrier or frequency-converted chrominance signal $E'_S$ of constant level being obtained at the output terminal 33 of amplifier 25. Further, the low-pass filter 29 which permits the passage therethrough of the detected output of detector 28 but inhibits the passage of the pilot signal component has an important bearing on the response speed and transient response of the described circuit, and a quick response cannot be obtained unless the low-pass filter 29 is a circuit with a small delay time.

Further, in the event that the pilot signal and its harmonics remained in the output of low-pass filter 29, cross modulation would occur in the color subcarrier or chrominance signal and would not be caused by the non-linear distortion of the control circuit 22. However, I have found that the circuit for filter 29 as shown on FIG. 4 operated very well and was adapted to eliminate the fundamental wave of the pilot signal and its second harmonic by means of the two traps, whereas the higher harmonic components were eliminated by the combination of the resistors and the capacitors. According to my experimental results, cross modulation was less than −40 dB, and, in the case of a level change of ±6 dB, the residual level deviation was ±1 to 1.5 dB and the frequency response speed was more than 20 kHz. The foregoing performance characteristics resulted from the fact that, in spite of using a closed loop, the continuous pilot signal was employed in place of the burst signal and the filter 29 for the detected output was made up of a circuit of short delay time. Thus, in accordance with this invention, level variations occurring at a frequency of more than several hundred Hertz can be effectively eliminated and the circuit therefor is very simple in construction.

Although an illustrative embodiment of this invention has been described in detail herein with reference to the drawings, it is to be noted that the invention is not limited to that precise embodiment, and that various changes and modifications may be effected therein by one skilled in the art without departing from the scope or spirit of the invention.

What is claimed is:

1. In a color video signal recording and reproducing apparatus; the combination of means for reproducing a recorded combined signal constituted by a carrier frequency-modulated with a luminance signal to form a luminance component, carriers amplitude-modulated with a chrominance signal and frequency-converted to a band substantially below that of said frequency-modulated luminance signal to form a chrominance component and a continuous pilot signal having a frequency adjacent that of the frequency-converted carriers of the chrominance signal so as to be similarly subjected to level variations during the recording and reproducing of said combined signal, means providing a mixed signal of the chrominance component and pilot signal separated from the reproduced combined signal, amplitude control means receiving said mixed signal for controlling the amplitude of said mixed signal, means for separating the pilot signal from the amplitude-controlled mixed signal, means for detecting the separated pilot signal and producing a control signal in dependence on variations thereof, and means applying said control signal to said amplitude control means so as to cause the latter to diminish undesirable variations in said chrominance component resulting from the recording and reproducing of said combined signal.

2. A color video signal and recording apparatus according to claim 1, in which said means providing said mixed signal includes means separately extracting said chrominance component and said pilot signal from said reproduced combined signal, and mixer circuit means receiving the extracted chrominance component and pilot signal at respective input terminals thereof.

3. A color video signal recording and reproducing apparatus according to claim 1, in which filter means are provided for separating said chrominance component from the amplitude-controlled mixed signal.

4. A color video signal recording and reproducing apparatus according to claim 1, in which filter means are provided for separating said control signal from the detected pilot signal.

5. A color video signal and recording apparatus according to claim 1, in which filter means are provided to extract said luminance component from the reproduced combined signal, and limiting means receive the extracted luminance component for eliminating excessive fluctuations in the level of said luminance component resulting from the recording and reproducing of said combined signal.

6. A color video signal recording and reproducing apparatus according to claim 5, further comprising demodulating means demodulating the limited luminance component from said limiting means to provide said luminance signal, filter means to extract the amplitude-controlled chrominance component from the amplitude-controlled mixed signal, frequency converting means to return the frequency of said carriers of the chrominance component to that of said chrominance signal, and synthesizer circuit means to combine the demodulated luminance component with the frequency-converted, amplitude-controlled chrominance component and thereby to reconstitute the color video signal comprised of said luminance and chrominance signals.

7. A color video signal recording and reproducing apparatus according to claim 6, in which said frequency converting means includes means to frequency multiply said pilot signal extracted from the reproduced combined signal, oscillator means having an output at the frequency of said carriers of the chrominance signal prior to the frequency conversion thereof, and means to beat up the frequency of said amplitude-controlled chrominance component with said multiplied pilot signal and the output of said oscillator means to avoid phase variations in said chrominance signals.

* * * * *